(12) United States Patent
Zheng et al.

(10) Patent No.: US 10,616,282 B2
(45) Date of Patent: Apr. 7, 2020

(54) NETWORK VOICE COMMUNICATION METHOD AND SYSTEM IMPLEMENTED BASED ON WEB COMMUNICATION PLUG-IN

(71) Applicant: FREEFLY881 COMMUNICATIONS INC., Beijing (CN)

(72) Inventors: Edward Zheng, Beijing (CN); Raymond Kwan, Beijing (CN)

(73) Assignee: FREEFLY881 COMMUNICATIONS INC., Beijing (CN)

( * ) Notice: Subject to any disclaimer, the term of this patent is extended or adjusted under 35 U.S.C. 154(b) by 0 days.

(21) Appl. No.: 16/039,504

(22) Filed: Jul. 19, 2018

(65) Prior Publication Data

US 2019/0028517 A1    Jan. 24, 2019

(30) Foreign Application Priority Data

Jul. 21, 2017    (CN) .......................... 2017 1 0602671

(51) Int. Cl.
*H04L 29/06*    (2006.01)

(52) U.S. Cl.
CPC ...... *H04L 65/1006* (2013.01); *H04L 65/1046* (2013.01); *H04L 65/1069* (2013.01); *H04L 65/1073* (2013.01); *H04L 65/608* (2013.01)

(58) Field of Classification Search
CPC ............. H04L 65/1006; H04L 65/1046; H04L 65/1073; H04L 65/1069; H04L 65/608
See application file for complete search history.

(56) References Cited

U.S. PATENT DOCUMENTS

| | | | |
|---|---|---|---|
| 2009/0144068 A1* | 6/2009 | Altberg ................. | G06Q 30/02 705/342 |
| 2009/0161843 A1* | 6/2009 | Sylvain ............... | H04L 65/1069 379/93.09 |
| 2014/0222957 A1* | 8/2014 | Gangadharan ........ | H04L 67/141 709/217 |
| 2014/0258389 A1* | 9/2014 | Sylvain ................ | H04L 65/104 709/203 |

\* cited by examiner

*Primary Examiner* — Dady Chery

(57) ABSTRACT

The disclosure relates to a network voice communication system implemented based on a web communication plug-in, comprising a web communication plug-in for establishing a call flow communication channel with a called party answering terminal to make a call, the web communication plug-in being embedded into a web, the web communication plug-in being provided with a call button component and a hang-up button component; a web real-time communication SIP server, for establishing a web real-time communication connection between the web communication plug-in and the called party answering terminal; a network voice communication SIP server, for establishing a web real-time communication connection between the web real-time communication SIP server and the called party answering terminal; and the called party answering terminal, for establishing a call flow communication channel with the web communication plug-into make a call with the requesting party.

10 Claims, 3 Drawing Sheets

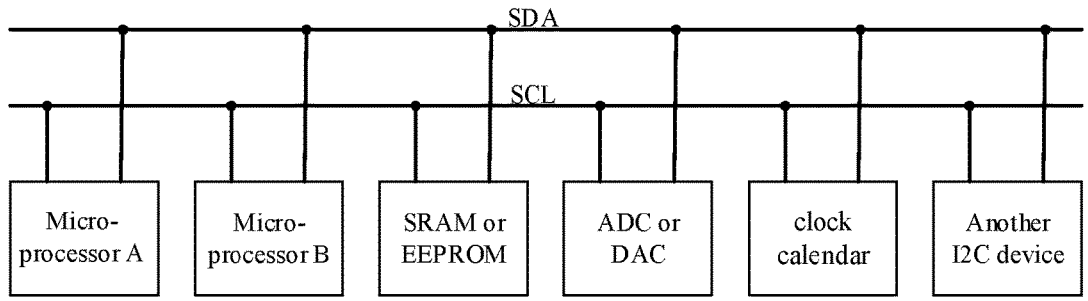

FIG. 1

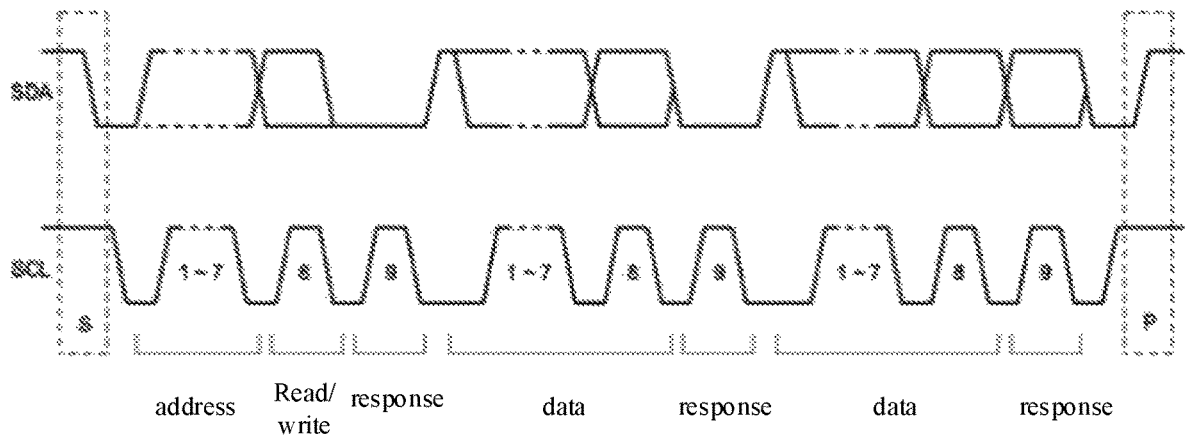

FIG. 2

100 setting, by a master device, a serial data line SDA of an I2C bus to be in a floating state in a case that the master device determines that the I2C bus is in a deadlock state ~ S110 controlling, by the master device, a serial clock line SCL of the I2C bus to successively output at least n+1 clocks after the master device sets the SDA to be in a floating state, where the at least n+1 clocks are used to control the SDA by the slave device to proceed to perform data transmission, and n is a data bit width of the I2C bus ~ S120

FIG. 3

NETWORK VOICE COMMUNICATION METHOD AND SYSTEM IMPLEMENTED BASED ON WEB COMMUNICATION PLUG-IN

CROSS-REFERENCE TO RELATED APPLICATIONS

The present application is based upon and claims priority of Chinese Patent Application No. 201710602671.9, filed before Chinese Patent Office on Jul. 21, 2017 and entitled "NETWORK VOICE COMMUNICATION METHOD AND SYSTEM IMPLEMENTED BASED ON WEB COMMUNICATION PLUG-IN," the entire contents of which is incorporated herein by reference.

TECHNICAL FIELD

The present disclosure relates to the field of network communication technologies, and in particular, to a network voice communication method and system implemented based on a web communication plug-in.

BACKGROUND

With the development of Wi-Fi and mobile Internet, the coverage rate thereof is becoming larger and larger. The sharing nature of the Internet has brought great convenience to people. In the field of communications, the utilization of the sharing nature of the Internet has resulted in free calls, and due to low expenses of network voice communication services, market demands for network voice communication products have been rapidly increased. For example, in methods for implementing network voice communication by downloading and installing an app or a plug-in, the network voice communication app or plug-in is mainly responsible for establishing and controlling a call, and is often designed to have multiple modules and multiple layers to distinguish different functions, and respective tasks are designed independently for these functional modules. Message exchange in communications via a traditional network voice communication app is directly performed by two clients. Both the calling party and the called party need to download and install a client or a plug-in for communication, which causes inconvenience and tediousness during network voice communications.

In addition, in 2010, Google acquired a web real-time communication (WebRTC) technology by purchasing Global IP Solutions for USD 68.20 million. The name of WebRTC originated from Web Real-Time Communication, and WebRTC is a technology supporting a web browser to perform real-time voice conversations or video conversations. The WebRTC technology provides the possibility for the requesting party to realize network voice communication without downloading and installing any client or plug-in.

SUMMARY

An objective of the present disclosure is to provide a network voice communication method and system implemented based on a web communication plug-in, to address the inconvenience that both parties need to download and install a client or a plug-in during existing network voice communications.

To achieve the above objective, the present disclosure discloses a network voice communication method implemented based on a web communication plug-in, the network voice communication method comprising: a requesting party requesting to call a preset number by a web communication plug-in; the web communication plug-in connecting a web real-time communication Session Initiation Protocol (SIP) server to start a web real-time communication connection; the web real-time communication SIP server registering the certificate with a network voice communication SIP server and initiating a call communication request; the network voice communication SIP server sending a communication invitation to a called party answering terminal; the called party accepting the communication invitation and establishing a communication connection with the web real-time communication SIP server via the network voice communication SIP server; the called party answering terminal starting a call flow with the web real-time communication SIP server via the network voice communication SIP server; the web communication plug-in starting a call flow with the web real-time communication SIP server; and the requesting party and the called party beginning the call via a call flow communication channel; wherein the preset number is the communication number of the called party registered with the network voice communication SIP server, the web communication plug-in is correlated, via a network, with the the called party answering terminal, the web real-time communication SIP server and the network voice communication SIP server.

According to the network voice communication method implemented based on a web communication plug-in disclosed in the present disclosure, the network voice communication method further comprises: the requesting party hanging up the network voice communication through the web communication plug-in; the web communication plug-in sending the hangup message through the web real-time communication SIP server and the network voice communication SIP server sequentially to the called party answering terminal; the called party answering terminal closing the communication connection with the network voice communication SIP server; the network voice communication SIP server canceling the registration of the certificate of the web real-time communication SIP server; the web real-time communication SIP server closing the communication connection with the web communication plug-in; the communication between the requesting party and the called party being hanged up.

According to the network voice communication method implemented based on a web communication plug-in disclosed in the present disclosure, the network voice communication method further comprises: the called party answering terminal hanging up the network voice communication; the called party answering terminal closing the communication connection with the network voice communication SIP server; the network voice communication SIP server cancelling the registration of the certificate of the web real-time communication SIP server; the web real-time communication SIP server closing the communication connection with the web communication plug-in; the communication between the requesting party and the called party being hanged up.

According to the network voice communication method implemented based on a web communication plug-in disclosed in the present disclosure, after the called party has accepted the communication invitation, the called party answering terminal passes the acceptance message back to the web communication plug-in via the network voice communication SIP server and the web real-time communication SIP server sequentially.

According to the network voice communication method implemented based on a web communication plug-in disclosed in the present disclosure, after receiving, from the web real-time communication SIP server, the acceptance message regarding the called party accepting the communication invitation, the web communication plug-in starts a call flow with the web real-time communication SIP server.

According to the network voice communication method implemented based on a web communication plug-in disclosed in the present disclosure, after receiving the acceptance message regarding the called party accepting the communication invitation, the web real-time communication SIP server starts a call flow with the called party answering terminal via the network voice communication SIP server.

According to the network voice communication method implemented based on a web communication plug-in disclosed in the present disclosure, the called party answering terminal, the network voice communication SIP server and the web real-time communication SIP server respectively close the communication connection with the network voice communication SIP server, cancel the registration of the certificate of the web real-time communication SIP server, and close the communication connection with the web communication plug-in, based on the hangup message received from the web communication plug-in.

According to the network voice communication method implemented based on a web communication plug-in disclosed in the present disclosure, the network voice communication SIP server and the web real-time communication SIP server respectively cancel the registration of the certificate of the web real-time communication SIP server and closes the communication connection with the web communication plug-in based on the hangup message of the called party answering terminal.

According to the network voice communication method implemented based on a web communication plug-in disclosed in the present disclosure, the requesting party connects a call flow communication channel between the web communication plug-in and the called party answering terminal by triggering a call button of the web communication plug-in of the web, and begins the talk with the called party, after the requesting party and the called party have begun the talk, the call button disappears, and the web communication plug-in displays a hang-up button on the web.

According to the network voice communication method implemented based on a web communication plug-in disclosed in the present disclosure, by scanning a two-dimensional code, the requesting party connects to a web loaded with a web communication plug-in, triggers a call button of the web communication plug-in on the web to connect to a call flow communication channel between the web communication plug-in and the called party answering terminal, begins the call talk with the called party, and after the requesting party and the called party have begun the talk, the web communication plug-in displays a hang-up button on the web.

The disclosure further discloses a network voice communication system implemented based on a web communication plug-in, characterized in that the network voice communication system comprises: a web communication plug-in for establishing a call flow communication channel with a called party answering terminal to make a call, the web communication plug-in being embedded into a web, the web communication plug-in being provided with a call button component and a hang-up button component, the call button component controlling the call button to disappear after the requesting party and the called party have begun the talk, the hang-up button component controlling the hang-up button to be displayed in the web; a web real-time communication SIP server, for establishing a web real-time communication connection between the web communication plug-in and the called party answering terminal, wherein the called party answering terminal establishes a web real-time communication connection with the web real-time communication SIP server via the network voice communication SIP server; a network voice communication SIP server, for establishing a web real-time communication connection between the web real-time communication SIP server and the called party answering terminal; and the called party answering terminal, for establishing a call flow communication channel with the web communication plug-in to make a call with the requesting party; wherein, after being registered with the network voice communication SIP server, the called party answering terminal obtains a communication number, and the web communication plug-in is correlated with the called party answering terminal, the web real-time communication SIP server and the network voice communication SIP server via a network.

The present disclosure has the following advantages:

The disclosure adopts the network voice communication technology and the web real-time communication technology to realize the communication between the requesting party and the called party without the requesting party downloading and installing a client or plug-in. The requesting party only needs to log in the relevant web of the called party through the network and uses the web communication plug-in on the web thereon, and then can call and communicate with the called party answering terminal by the web real-time communication SIP server and the network voice communication SIP server. In addition, the requesting party can also use its own communication terminal to scan a two-dimensional code, connects the web loaded with the web communication plug-in, and triggers the call button of the communication plug-in on the web, which greatly facilitates the requesting party to call the caller and perform network communication.

BRIEF DESCRIPTION OF THE DRAWINGS

FIG. 1 is a flow chart of a network voice communication method implemented based on a web communication plug-in disclosed in the present disclosure.

FIG. 2 is a flow chart of a user registration phase of a web real-time voice communication method implemented based on scanning two-dimensional code disclosed in the present disclosure.

FIG. 3 is a flow chart of a call plug-in setting phase of the network voice communication method implemented based on a web communication plug-in disclosed in the present disclosure.

DETAILED DESCRIPTION OF THE EMBODIMENTS

Figure 4A:
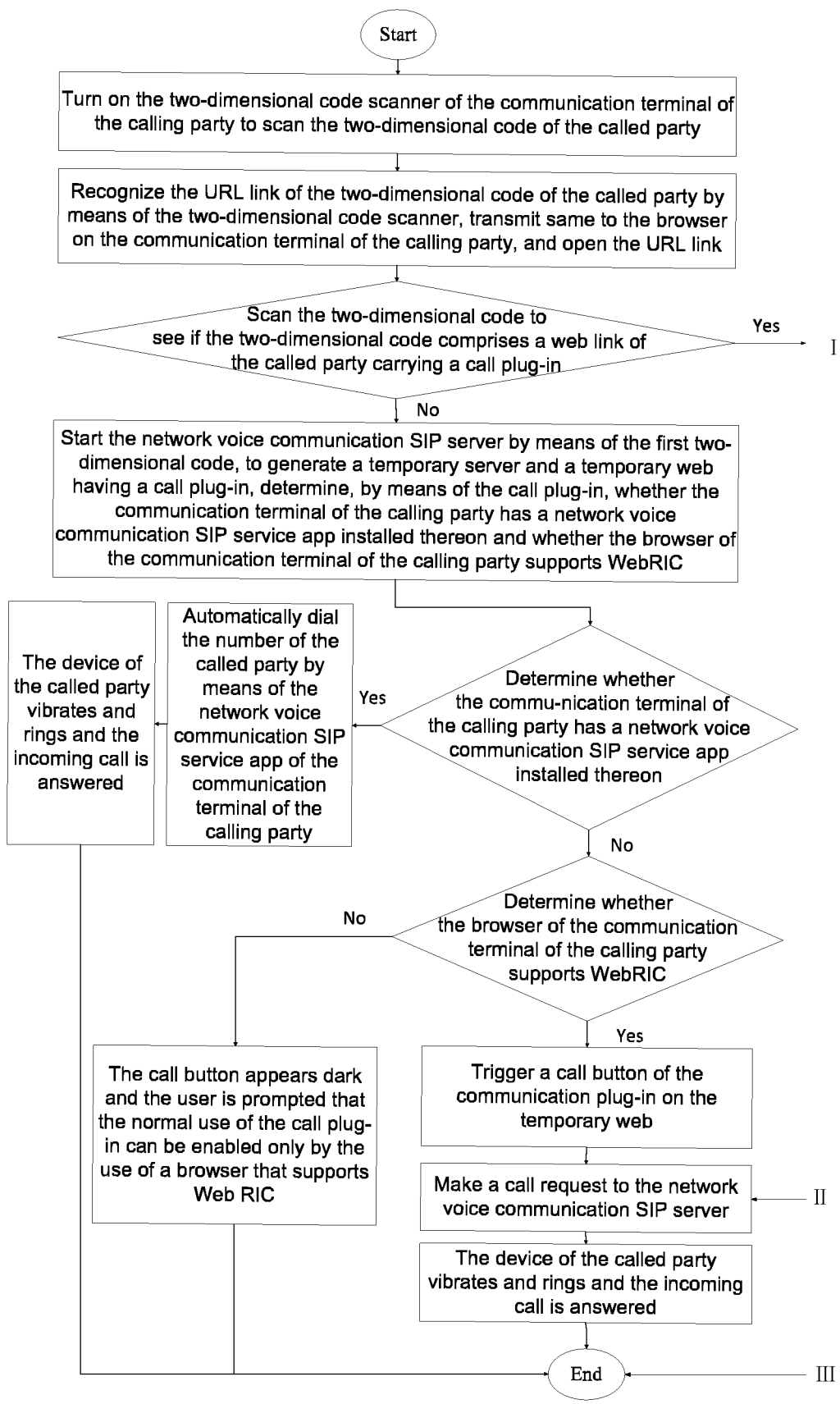
FIG. 4(a) and FIG. 4(b) is a flow chart of a scanning two-dimensional code and call requesting phase of the web real-time voice communication method implemented based on scanning two-dimensional code disclosed in the present disclosure.

The following embodiments are intended to illustrate the present disclosure rather than limit the scope of the present disclosure.

Embodiment 1

Referring to FIG. 1, the network voice communication system implemented based on a web communication plug-in disclosed in the present embodiment comprises: a web communication plug-in 02, a web real-time communication SIP server 03, a network voice communication SIP server 04 and a called party answering terminal 05.

Wherein, the web communication plug-in 02 is used for establishing a call flow communication channel with the called party answering terminal 05 to make a call, the web communication plug-in 02 is embedded into a web, and the web communication plug-in 02 is provided with a call button component and a hang-up button component. The call button component controls the call button to disappear after the requesting party and the called party have begun the talk, and the hang-up button component controls the hang-up button to be displayed in the web. The web real-time communication SIP server 03 is used for establishing a web real-time communication connection between the web communication plug-in 02 and the called party answering terminal 05, comprising establishing a web real-time communication connection between the web communication plug-in 02 and the web real-time communication SIP server 03 and establishing a web real-time communication connection between the web real-time communication SIP server 03 and the called party answering terminal 05, wherein establishing a web real-time communication connection between the web communication plug-in 02 and the web real-time communication SIP server 03 is performed by the requesting party 01 by logging into the web and establishing a web real-time communication connection by the web communication plug-in 02 and the web real-time communication SIP server 03; establishing a web real-time communication connection between the web real-time communication SIP server 03 and the called party answering terminal 05 is performed by the called party answering terminal 05 by establishing a web real-time communication connection via the network voice communication SIP server 04 and the web real-time communication SIP server 05. The network voice communication SIP server 04 is used for establishing a web real-time communication connection between the web real-time communication SIP server 03 and the called party answering terminal 05. The called party answering terminal 05 comprises a mobile phone, a computer, a tablet computer, an IP phone (web phone), and an internet phone (Internet accessible, without a telecommunication signal receiving function), and is used for establishing a call flow communication channel with the web communication plug-in 02 in order for a call with the requesting party 01; wherein after being registered with the network voice communication SIP server 04, the called party answering terminal 05 obtains a communication number; the web communication plug-in 02 is correlated, via the network, with the called party answering terminal 05, the web real-time communication SIP server 03 and the network voice communication SIP server 04; the called party answering terminal 05 is correlated, via the network, with the network voice communication SIP server 04; and the network voice communication SIP server 04 is also correlated, via the network, with the web real-time communication SIP server 03.

Referring to FIG. 1, the above-mentioned network voice communication system implemented based on a web communication plug-in may implement a network voice communication system implemented based on a web communication plug-in, specifically comprising: the requesting party 01 requesting to call a preset number by the web communication plug-in 02; the web communication plug-in 02 connecting the web real-time communication SIP server 03 to start a web real-time communication connection; the web real-time communication SIP server 03 registering the certificate with the network voice communication SIP server 04 and initiating a call communication request; the network voice communication SIP server 04 sending a communication invitation to the called party answering terminal 05; after the called party accepts the communication invitation, the called party answering terminal 05 passing the acceptance message back to the web communication plug-in 02 via the network voice communication SIP server 04 and the web real-time communication SIP server 03 sequentially; after the web real-time communication SIP server 03 and the network voice communication SIP server 04 receive the acceptance message regarding the called party accepting the communication invitation, the web real-time communication SIP server 03 establishing a communication connection with the called party via the network voice communication SIP server 04; the called party answering terminal 05 starting a call flow with the web real-time communication SIP server 03 via the network voice communication SIP server 04; after receiving from the web real-time communication SIP server 03 the acceptance message regarding the called party accepting the communication invitation, the web communication plug-in 02 starting a call flow with the web real-time communication SIP server 03; thus the requesting party 01 and the called party beginning the talk via a call flow communication channel.

The preset number is the communication number of the called party registered with the network voice communication SIP server 04, and further, the method for the network voice communication SIP server 04 to provide network voice communication comprises: users over the world applying for a network voice communication service from the network voice communication SIP server 04 via a network voice communication client; a user registering user information; the user creating a network voice communication number using his or her own mobile phone number, the network voice communication number being composed of a fixed three-digit number, country code and a mobile phone number arranged in turn, the three-digit number being 881; or, the system pushing a plurality of network voice communication numbers; the user selecting one from the plurality of network voice communication numbers pushed as his or her own network voice communication number, the network voice communication number being composed of a fixed three-digit number and ten arbitrary digits arranged in sequence, the fixed three-digit number being 882; the user obtaining a network voice communication number, the network voice communication number being completely composed of multiple digits; generating user information, the user information comprising name, network voice communication number and e-mail address, these three kinds of information being necessary, the user information additionally further comprising one or more of mobile phone number, country, network link, website address, occupation, and personal description, wherein the personal description could be composed of one or more keywords, and the foregoing information could be selectively filled in by the user; forming a phone book based on the generated user information, and displaying same on the user terminal, thereby a free global phone book service being able to be realized through Wi-Fi and the Internet, wherein a user queries the phone book through a key character or a keyword in a user terminal, the company and personal information of the user information can be searched for globally, and the unique global phone book search integrates registered users any-where in the world, and can help companies and individuals to be confirmed and contacted; using the network voice communication number as the network address of the user's network voice communication; users having obtained the network voice communication number carrying out voice communication therebetween through the Internet; wherein, users who have been registered and have obtained a network voice communication number for network voice communication do not need the process of invitation or acceptance or authentication therebetween, that is, do not need the process of invitation or acceptance or authentication in order to call a contact on the contact list of the phone book, as long as users directly dial the network voice communication number after logging in to the network voice communication client, without international roaming charges at the same time.

In the above description, one purpose of registering a network voice communication number for a company user may be to allow more people to search for themselves through the global phone book. In addition to the contact of the company, contact information, website address, and profile of the company to be filled in, keyword is a very important part. During user information registration, the user fills out the first page of detailed information, submits it and comes to the second page, where the user is asked to fill in website address, link, industry, keyword and profile, all of which are selective, however the more information is filled in, the more probably the user will be discovered, especially when a keyword is set. A part of the name of the company can be extracted for keyword settings. For example, with regard to a wood company, considering the customer's needs, wood can be used as a keyword, the name of a product of the company or the industry to which the company belongs may also be selected, and the best way is to successfully set all the three kinds of keywords, as setting more keywords can increase the probability of being searched for.

Referring to FIG. 1, the above-mentioned network voice communication method implemented based on a web communication plug-in further comprises: the requesting party 01 hanging up the network voice communication via the web communication plug-in 02; the web communication plug-in 02 transmitting the hangup message to the called party answering terminal 05 via the web real-time communication SIP server 03 and the network voice communication SIP server 04 sequentially; after receiving the hangup message from the web communication plug-in, the called party answering terminal 05 closing the communication connection with the network voice communication SIP server 04 based on the hangup message; after receiving the hangup message from the web communication plug-in, the network voice communication SIP server 04 cancelling the registration of the certificate of the web real-time communication SIP server 03 based on the hangup message; after receiving the hangup message from the web communication plug-in, the web real-time communication SIP server 03 closing the communication connection with the web communication plug-in 02; thus, the communication between the requesting party and the called party being hanged up.

In addition, the above network voice communication method implemented based on a web communication plug-in may further comprise hanging up the network voice communication between the requesting party and the called party by the called party answering terminal, specifically comprising: the called party answering terminal 05 hanging up the network voice communication; the called party answering terminal closing the communication connection with the network voice communication SIP server; the network voice communication SIP server 04 cancelling the registration of the certificate of the web real-time communication SIP server based on the hangup message of the called party answering terminal; the web real-time communication SIP server closing the communication connection with the web communication plug-in based on the hangup message of the called party answering terminal; thus, the communication between the requesting party and the called party being hanged up. At the time, the called party answering terminal 05 does not need to send the hangup message to the web communication plug-in 02 through the network voice communication SIP server 04 and the web real-time communication SIP server 03 in sequence, the web communication plug-in 02, the web real-time communication SIP server 03 and the network voice communication SIP server 04 can also obtain the hangup message regarding the called party answering terminal 05 hanging up the network voice communication, that is, when the called party answering terminal closes the communication connection with the network voice communication SIP server 04, the network voice communication SIP server 04 automatically obtains the hangup message; when the network voice communication SIP server 04 cancels the registration of the certificate of the web real-time communication SIP server, the web real-time communication SIP server 03 automatically obtains the hang up message; when the web real-time communication SIP server 03 closes the communication connection with the web communication plug-in 02, the web communication plug-in 02 automatically obtains the hangup message.

In addition, the requesting party 01 connects to a web loaded with a web communication plug-in by scanning a two-dimensional code, triggers a call button of the web communication plug-in 02 on the web to connect to a call flow communication channel between the web communication plug-in 02 and the called party answering terminal 05, begins the call talk with the called party, and after the requesting party 01 and the called party have begun the talk, the web communication plug-in 02 displays a hang-up button on the web.

The web real-time voice communication method implemented based on scanning two-dimensional code disclosed in this embodiment comprises the following three phases: a user registration phase, a call plug-in setting phase, and a scanning two-dimensional code and call requesting phase.

Referring to FIG. 2, the above-mentioned user registration phase comprises: registering a user with a network voice communication SIP server and obtaining a network voice communication SIP number; the network voice communication SIP server associating the user information with the user selected network voice communication SIP number and storing same in a database; the network voice communication SIP server generating, for the user, a first two-dimensional code carrying the registered user information, a user SIP Uniform Resource Identifier (URI) link and a network voice communication SIP server Uniform Resource Locator (URL) link; the network voice communication SIP server storing the first two-dimensional code in the database and completing the registration. In this way, by being registered with the network voice communication SIP server, the user obtains not only the network voice communication SIP number but also the first two-dimensional code. In addition, after the registration has been completed, a jump to the call start page is carried out, and the call start page is provided with a start to dial button and a call plug-in generation guide button, by use of which call plug-in generation guide button a jump to a call plug-in setting guide page may be carried out, where the user is guided step by step to set the call plug-in on their own website and is prompted to prepare the URL link of the address of their own website for the setting of the call plug-in, and the user may make a call using the start to dial button.

Referring to FIG. 3, the above-mentioned call plug-in setting phase comprises: the registered user successfully logging in to his or her own account on the network voice communication SIP server website; upon the successful login, the user seeing a call plug-in generation button, clicking this button, jumping to a call plug-in introduction page, where the user is guided about how to complete the call plug-in setting on the user page; prompting the user whether to set the call plug-in immediately; if the user refuses to set the call plug-in immediately, prompting the user that the user may return at any time (that is, when the user agrees to set the call plug-in immediately) to complete the setting and obtain a second two-dimensional code; if the user agrees to set the call plug-in immediately, generating the HyperText Markup Language (HTML) code of the call plug-in for the user, and displaying same together with a call plug-in installation guide; prompting the user whether the user has determined to use the website URL Link of the call plug-in; if the user has not yet determined to use the website URL link of the call plug-in, prompting the user that the user may return at any time (that is, when the user has determined to use the website URL link of the call plug-in) to complete the setting and obtain the second two-dimensional code; if the user has determined to use the website URL of the call plug-in, the user inputting the selected URL link; associating the determined URL link with the HTML code of the call plug-in and storing same in the database; generating, for the user, the second two-dimensional code carrying the determined URL link, and displaying same on the screen; storing the second two-dimensional code information in the database; prompting the user that the generated HTML code of the call plug-in must be set on the website of the determined URL link, otherwise the communication function of the call plug-in and the second two-dimensional code cannot be implemented; the user embedding the generated HTML code of the call plug-in into the web of the determined URL link.

In the above-mentioned user registration phase and call plug-in setting phase, when storing the user information and the user-selected network voice communication SIP number, first two-dimensional code, and second two-dimensional code, the network voice communication SIP server needs to associate the user information with the user selected network voice communication SIP number, first two-dimensional code and second two-dimensional code.

Figure 4B:
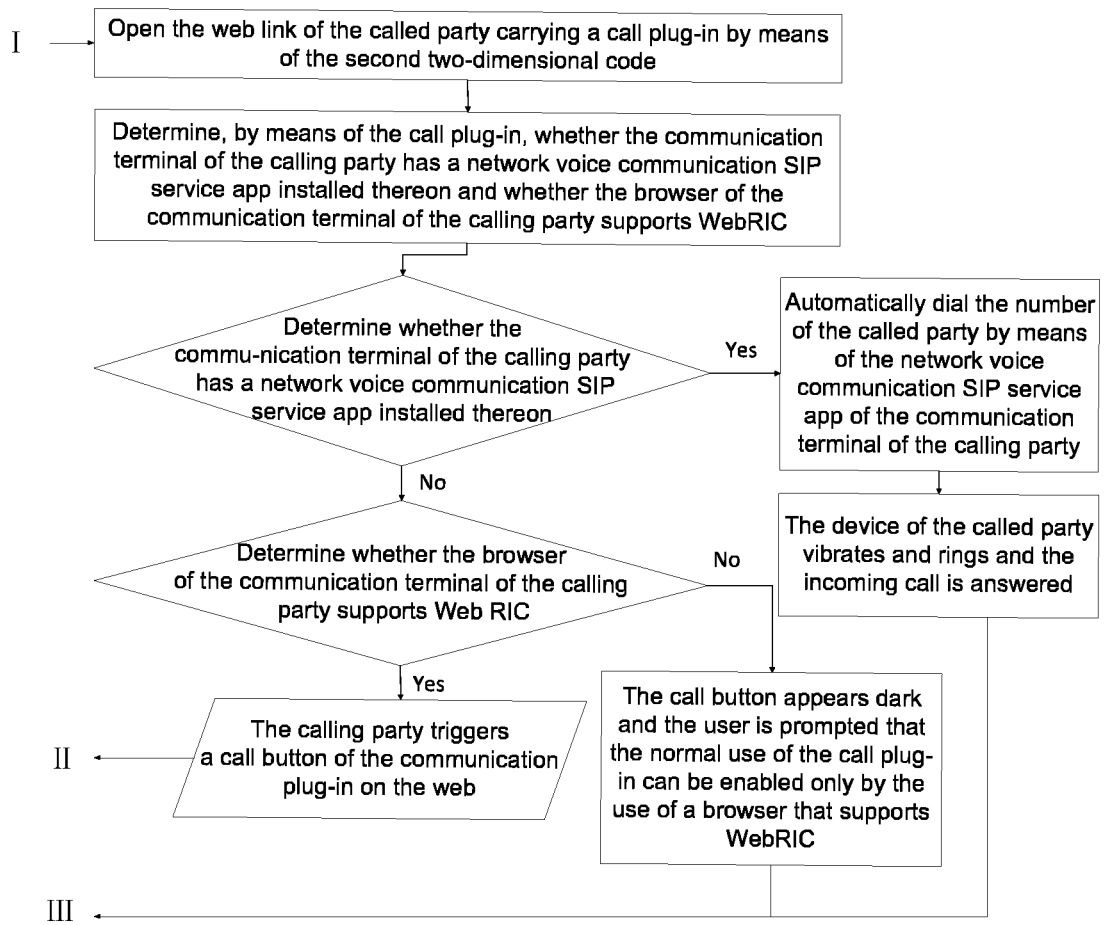

Referring to FIGS. 4(a) and 4(b), the above-mentioned scanning two-dimensional code and call requesting phase comprises: turning on the two-dimensional code scanner of the communication terminal of the calling party to scan the two-dimensional code of the called party; recognizing, by the two-dimensional code scanner, the URL link of the two-dimensional code of the called party, transmitting same to the browser on the communication terminal of the calling party, and opening the URL link; recognizing, according to the two-dimensional code information, the scanned two-dimensional code of the called party as the first two-dimensional code or the second two-dimensional code, wherein the recognition process is also intended to recognize whether the scanned two-dimensional code comprises the web of the called party carrying the call plug-in, if the scanned two-dimensional code is the second two-dimensional code, the scanned two-dimensional code comprises the web of the called party carrying the call plug-in, otherwise, if the scanned two-dimensional code of the called party is the first two-dimensional code, the scanned two-dimensional code does not comprise the web of the called party carrying the calling plug-in; if the scanned two-dimensional code of the called party is the second two-dimensional code, opening, base on the second two-dimensional code, the website link of the called party carrying the call plug-in; determining, by the call plug-in on the web of the called party, whether the communication terminal of the calling party has a network voice communication SIP service app installed thereon and whether the browser of the communication terminal of the calling party supports web real-time communication (WebRTC); first determining whether the communication terminal of the calling party has a network voice communication SIP service app installed thereon; if the communication terminal of the calling party has a network voice communication SIP service app installed thereon, automatically dialling the number of the called party by the network voice communication SIP service app of the communication terminal of the calling party; if the communication terminal of the calling party does not has a network voice communication SIP service app installed thereon, determining whether the browser of the communication terminal of the calling party supports WebRTC; if the browser of the communication terminal of the calling party supports WebRTC, triggering the call button of the web communication plug-in to make a call request to the network voice communication SIP server; if the browser of the communication terminal of the calling party does not support WebRTC, the call button of the web communication plug-in appearing dark and prompting the user that the normal use of the call plug use can be enabled only by the use of a browser that supports WebRTC; if the scanned two-dimensional code of the called party is the first two-dimensional code, starting, base on the first two-dimensional code, the network voice communication SIP server to generate a temporary server associated with the registered user information of the called party and the user SIP URI link; the temporary server generating a temporary web carrying a call plug-in associated with the registered user information of the called party and the user SIP URI; determining, by the call plug-in on the temporary web of the called party, whether the communication terminal of the calling party has a network voice communication SIP service app installed thereon and whether the browser of the communication terminal of the calling party supports WebRTC; first determining whether the communication terminal of the calling party has a network voice communication SIP service app installed thereon; if the communication terminal of the calling party has a network voice communication SIP service app installed thereon, automatically dialling the number of the called party by the network voice communication SIP service app of the communication terminal of the calling party; if the communication terminal of the calling party does not have a network voice communication SIP service app installed thereon, determining whether the browser of the communication terminal of the calling party supports WebRTC; if the browser of the communication terminal of the calling party supports WebRTC, triggering the call button of the temporary web communication plug-in to make a call request to the network voice communication SIP server; if the browser of the communication terminal of the calling party does not support WebRTC, the call button of the temporary web communication plug-in appearing dark and prompting the user that the normal use of the call plug-in can be enabled only by the use of a browser supporting WebRTC.

As described above, after scanning a unique technical link using a two-dimensional code to open the web of the called party or temporarily generate a temporary web, the network voice communication system implemented based on the web communication plug-in can implement network voice communication. Further, it implements a call between the calling party and the called party by establishing a web real-time communication channel between the calling party and the called party by the web real-time communication SIP server and the network voice communication SIP server. The specific call requesting process and the process of establishing the web real-time communication channel have been described hereinabove and will be omitted herein.

Although the present disclosure has been described above in detail with general description and specific embodiments, it is obvious to those skilled in the art that some modifications or improvements can be made on the basis of the present disclosure. Therefore, these modifications or improvements made without departing from the spirit of the present disclosure all fall within the protection scope of the present disclosure.

What is claimed is:

1. A network voice communication method based on a web communication plug-in, comprising:
    a requesting party requesting to call a preset digital number via a web communication plug-in, wherein the preset digital number and is registered by a called party with a network voice communication SIP server;
    the web communication plug-in connecting a web real-time communication Session Initiation Protocol (SIP) server to start a web real-time communication connection to set up a network communication with the called party having the preset digital number;
    the web real-time communication SIP server registering a certificate with the network voice communication SIP server and initiating a call communication request;
    the network voice communication SIP server sending a communication invitation to a called party answering terminal registered with the preset digital number;
    the called party accepting the communication invitation and establishing a communication connection with the web real-time communication SIP server via the network voice communication SIP server;
    the called party answering terminal starting a call flow with the web real-time communication SIP server via the network voice communication SIP server;
    the web communication plug-in starting a call flow with the web real-time communication SIP server; and
    the requesting party and the called party beginning the call via a call flow communication channel;
    wherein the web communication plug-in is correlated, via a network, with the called party answering terminal, the web real-time communication SIP server, and the network voice communication SIP server.

2. The network voice communication method based on a web communication plug-in according to claim 1, further comprising:
    the requesting party hanging up the network voice communication via the web communication plug-in;
    the web communication plug-in sending the hangup message through the web real-time communication SIP server and the network voice communication SIP server sequentially to the called party answering terminal;
    the called party answering terminal closing the communication connection with the network voice communication SIP server;
    the network voice communication SIP server canceling the registration of the certificate of the web real-time communication SIP server;
    the web real-time communication SIP server closing the communication connection with the web communication plug-in; and
    the communication between the requesting party and the called party being hanged up.

3. The network voice communication method based on a web communication plug-in according to claim 2, wherein the called party answering terminal, the network voice communication SIP server and the web real-time communication SIP server respectively close the communication connection with the network voice communication SIP server, cancel the registration of the certificate of the web real-time communication SIP server, and close the communication connection with the web communication plug-in, based on the hangup message received from the web communication plug-in.

4. The network voice communication method based on a web communication plug-in according to claim 1, further comprising:
    the called party answering terminal hanging up the network voice communication;
    the called party answering terminal closing the communication connection with the network voice communication SIP server;
    the network voice communication SIP server cancelling the registration of the certificate of the web real-time communication SIP server;
    the web real-time communication SIP server closing the communication connection with the web communication plug-in; and
    the communication between the requesting party and the called party being hanged up.

5. The network voice communication method based on a web communication plug-in according to claim 4, wherein the network voice communication SIP server and the web real-time communication SIP server respectively cancel the registration of the certificate of the web real-time communication SIP server and closes the communication connection with the web communication plug-in based on the hangup message of the called party answering terminal.

6. The network voice communication method based on a web communication plug-in according to claim 1, wherein after the called party has accepted the communication invitation, the called party answering terminal passes the acceptance message back to the web communication plug-in via the network voice communication SIP server and the web real-time communication SIP server sequentially.

7. The network voice communication method based on a web communication plug-in according to claim 1, wherein after receiving, from the web real-time communication SIP server, the acceptance message regarding the called party accepting the communication invitation, the web communication plug-in starts a call flow with the web real-time communication SIP server, and after receiving the acceptance message regarding the called party accepting the communication invitation, the web real-time communication SIP server starts a call flow with the called party answering terminal via the network voice communication SIP server.

8. The network voice communication method based on a web communication plug-in according to claim 1, wherein the requesting party connects a call flow communication channel between the web communication plug-in and the called party answering terminal by triggering a call button of the web communication plug-in of the web, and begins the talk with the called party, after the requesting party and the called party have begun the talk, the call button disappears, and the web communication plug-in displays a hang-up button on the web.

9. The network voice communication method based on a web communication plug-in according to claim 1, wherein, by scanning a two-dimensional code, the requesting party connects to a web loaded with a web communication plug-in, triggers a call button of the web communication plug-in on the web to connect to a call flow communication channel between the web communication plug-in and the called party answering terminal, begins the call talk with the called party, and after the requesting party and the called party have begun the talk, the web communication plug-in displays a hang-up button on the web.

10. A network voice communication system based on a web communication plug-in, comprising:
the web communication plug-in, for calling a preset digital number of a called party, the web communication plug-in being embedded into a related web of the called party, the web communication plug-in being provided with a call button component and a hang-up button component, the call button component controlling the call button to disappear after the requesting party and the called party have begun the talk, the hang-up button component controlling the hang-up button to be displayed in the web;
a web real-time communication SIP server, for establishing a web real-time communication connection between the web communication plug-in and a called party answering terminal, wherein the called party answering terminal establishes a web real-time communication connection with the web real-time communication SIP server via the network voice communication SIP server;
a network voice communication SIP server, for registering the preset digital number of the called party and establishing a web real-time communication connection between the web real-time communication SIP server and the called party answering terminal; and
the called party answering terminal, for establishing a call flow communication channel with the web communication plug-in to make a call with the requesting party;
wherein, after being registered with the network voice communication SIP server, the called party answering terminal obtains a communication number, and the web communication plug-in is correlated with the called party answering terminal, the web real-time communication SIP server and the network voice communication SIP server via a network.

* * * * *